(12) United States Patent
Moran et al.

(10) Patent No.: US 8,649,821 B2
(45) Date of Patent: Feb. 11, 2014

(54) NOTEBOOK COMPUTER AND CELL PHONE ASSEMBLY

(75) Inventors: Dov Moran, Kfar Saba (IL); Eyal Bychkov, Hod Hasharon (IL); Uri Ron, Kfar Saba (IL); Itay Sherman, Hod Hasharon (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/613,026

(22) Filed: Sep. 13, 2012

(65) Prior Publication Data

US 2013/0067262 A1 Mar. 14, 2013

Related U.S. Application Data

(60) Division of application No. 12/605,501, filed on Oct. 26, 2009, now Pat. No. 8,340,721, which is a continuation-in-part of application No. 12/415,116, filed on Mar. 31, 2009, and a continuation-in-part of application No. 12/151,079, filed on May 3, 2008, now Pat. No. 8,260,348.

(60) Provisional application No. 61/108,610, filed on Oct. 27, 2008, provisional application No. 61/043,179, filed on Apr. 8, 2008, provisional application No. 61/069,987, filed on Mar. 19, 2008.

(51) Int. Cl.
*H04B 1/38* (2006.01)
*G06F 1/00* (2006.01)
*H04M 3/00* (2006.01)

(52) U.S. Cl.
USPC ....... 455/557; 713/323; 455/573; 379/373.02

(58) Field of Classification Search
USPC .......................................... 455/557; 713/323
See application file for complete search history.

(56) References Cited

U.S. PATENT DOCUMENTS

| | | | |
|---|---|---|---|
| 6,442,443 B1 * | 8/2002 | Fujii et al. | 700/94 |
| 2002/0013162 A1 * | 1/2002 | Whitney | 455/557 |
| 2004/0068158 A1 * | 4/2004 | Bennett | 600/28 |
| 2007/0154009 A1 * | 7/2007 | Cameron et al. | 379/373.02 |
| 2010/0273536 A1 * | 10/2010 | Shaffer et al. | 455/573 |

* cited by examiner

Primary Examiner — Timothy Pham
(74) Attorney, Agent, or Firm — Soquel Group LLC

(57) ABSTRACT

A communication system including, a computer including a controller operable to transition between a plurality of power modes, including a normal power mode and at least one power saving mode, an amplifier that may be enabled or disabled by the controller, to receive audio data from said controller, and a battery to supply power to the controller and to the amplifier, and a communicator coupled to the computer, including a modem to communicate over a wireless network, to enable the amplifier, and to transmit audio data to the amplifier, and a power supply to supply power to the modem.

13 Claims, 7 Drawing Sheets

NOTEBOOK COMPUTER AND CELL PHONE ASSEMBLY

CROSS REFERENCES TO RELATED APPLICATIONS

This application is a divisional of U.S. Ser. No. 12/605,501, entitled NOTEBOOK COMPUTER AND CELL PHONE ASSEMBLY, filed on Oct. 26, 2009 now U.S. Pat. No. 8,340,721 by inventors Dov Moran, Eyal Bychkov, Uri Ron and Itay Sherman. U.S. Ser. No. 12/605,501 is a continuation-in-part of assignee's pending application U.S. Ser. No. 12/415,116, entitled MODULAR CELL PHONE FOR FIXED MOBILE CONVERGENCE, filed on Mar. 31, 2009 by inventors Itay Sherman, Eyal Bychkov and Uri Ron, which claims priority from U.S. Provisional Application No. 61/043,179, entitled MODULAR CELL PHONE FOR FIXED MOBILE CONVERGENCE, filed on Apr. 8, 2008 by inventors Itay Sherman, Eyal Bychkov and Uri Ron.

U.S. Ser. No. 12/605,501 is also a continuation-in-part of assignee's application U.S. Ser. No. 12/151,079, entitled MODULAR CELL PHONE FOR LAPTOP COMPUTERS, filed on May 3, 2008 U.S. Pat. No. 8,260,348 by inventor Itay Sherman, which claims priority from U.S. Provisional Application No. 61/069,987, entitled MODULAR CELL PHONE FOR LAPTOP COMPUTERS, filed on Mar. 19, 2008 by inventor Itay Sherman.

U.S. Ser. No. 12/605,501 claims benefit of U.S. Provisional Application No. 61/108,610, entitled NOTEBOOK COMPUTER AND CELL PHONE ASSEMBLY, filed on Oct. 27, 2008 by inventors Dov Moran, Eyal Bychkov and Uri Ron.

FIELD OF THE INVENTION

The present invention relates to computers with cell phone functionality.

BACKGROUND OF THE INVENTION

People often travel with small computers, such as notebook computers, for mobile access to their data files and applications. People also often travel with cell phones, for cellular communication. It is thus of advantage to have one assembly that combines the notebook computers with the cell phone. Currently notebook computers have wireless modems, which are used to provide voice over IP services, such as Skype. Some notebook computers have small built-in cameras, which are used to provide video conferencing services. However, when conducting private conversations, users prefer to hold a small handheld device that can be conveniently held close to their ears and used quietly.

SUMMARY OF THE DESCRIPTION

Aspects of the present invention relate to a notebook computer that includes a small cell phone which can be detached from the notebook computer and used in private quiet conversation. When the cell phone is attached or otherwise in communication with the notebook computer, the notebook computer enables voice over IP, instant messaging, and other communication applications; and if the notebook computer includes a camera, then the cell phone further enables video conferencing.

As such, embodiments of the present invention provide a notebook computer and cell phone assembly, with a cell phone that "pops out" of the computer for use as a standalone handset. Moreover, there is a seamless transition with no interruption of cellular service when the cell phone is detached from or re-attached to the computer.

Further aspects of the present invention relate to enabling and powering an amplifier of the notebook computer when the cell phone is attached to the notebook computer, regardless of whether the notebook computer is in a normal power mode or in a power saving mode such as standby mode, hibernate mode, sleep mode or turned off. The amplifier is used to provide speaker output for a phone call, and to indicate that a call is incoming, or such other call status.

Three alternative embodiments for enabling and powering the amplifier, when the cell phone is attached to the notebook computer, may be used; namely, (i) powering the amplifier from the notebook computer battery regardless of the power state of the notebook computer, (ii) powering the amplifier from the notebook computer battery when the notebook computer is in a normal power mode, and powering the amplifier from the cell phone power supply when the notebook computer is in a power saving node, and (iii) powering the amplifier from the cell phone power supply regardless of the power state of the notebook computer.

Similar embodiments are used for powering an LED indicator of the computer, when the cell phone is attached to the computer. The LED indicator is lit to indicate an incoming call, an ongoing call, or such other call status.

There is thus provided in accordance with an embodiment of the present invention a computer and cell phone assembly, including a communicator including a modem to communicate over a wireless network, and a notebook computer, including a pouch for physically to attach the communicator to the notebook computer, and a connection indicator to indicate arrival of an incoming phone call from the wireless network when the communicator is attached to the notebook computer, wherein the communicator is operative to receive the incoming phone call whether it remains attached to the notebook computer or whether it is subsequently detached from the notebook computer.

There is additionally provided in accordance with an embodiment of the present invention a method for communication, including indicating, by a notebook computer having a communicator attached thereto, arrival of an incoming phone call from a mobile network, and receiving, by communicator, the incoming call whether the communicator remains attached to the notebook computer or whether the communicator is subsequently detached from the notebook computer.

There is further provided in accordance with an embodiment of the present invention a communication system including a computer including a controller operable to transition between a plurality of power modes, including a normal power mode and at least one power saving mode, an amplifier that may be enabled or disabled by the controller, to receive audio data from said controller, and a battery to supply power to the controller and to the amplifier, and a communicator coupled to the computer, including a modem to communicate over a wireless network, to enable the amplifier, and to transmit audio data to the amplifier, and a power supply to supply power to the modem.

There is yet further provided in accordance with an embodiment of the present invention a method for enabling and powering an amplifier of a computer when a communicator is attached to the computer, including if the computer is operating in a normal power mode, then enabling, by the computer, the amplifier, if the computer is operating in a power saving mode, then enabling, by the communicator, the amplifier, and supplying power from a battery of the computer to the amplifier.

There is moreover provided in accordance with an embodiment of the present invention a method for enabling and powering an amplifier of a computer when a communicator is attached to the computer, including if the computer is operating in a normal power mode, then enabling, by the computer, the amplifier, and supplying power from a battery of the computer to the amplifier, and if the computer is operating in a power saving mode, then enabling, by the communicator, the amplifier, and supplying power from a power supply of the communicator to the amplifier.

There is additionally provided in accordance with an embodiment of the present invention a method for enabling and powering an amplifier of a computer when a communicator is attached to the computer, including if the computer is operating in a normal power mode, then enabling, by the computer, the amplifier, if the computer is operating in a power saving mode, then enabling, by the communicator, the amplifier, and supplying power from a power supply of the communicator to the amplifier.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to a notebook computer and cell phone assembly. The cell phone is used in conjunction with the computer for telecommunication applications, including inter alia Skype, Instant Messenger and video conferencing. In addition the cell phone detaches from the computer for use as a standalone handset in private quiet conversation.

When the cell phone is attached to the notebook computer, incoming calls to the cell phone are detected by the computer, and the computer activates an indicator to notify a user of the call. The indicator may be inter alia a blinking LED or such other visual indicator, or a ringing speaker or such other audio indicator, or both. Activation of the indicator occurs whether the computer is in normal power mode, standby mode, hibernate mode, sleep mode, or turned off.

Figure 1:
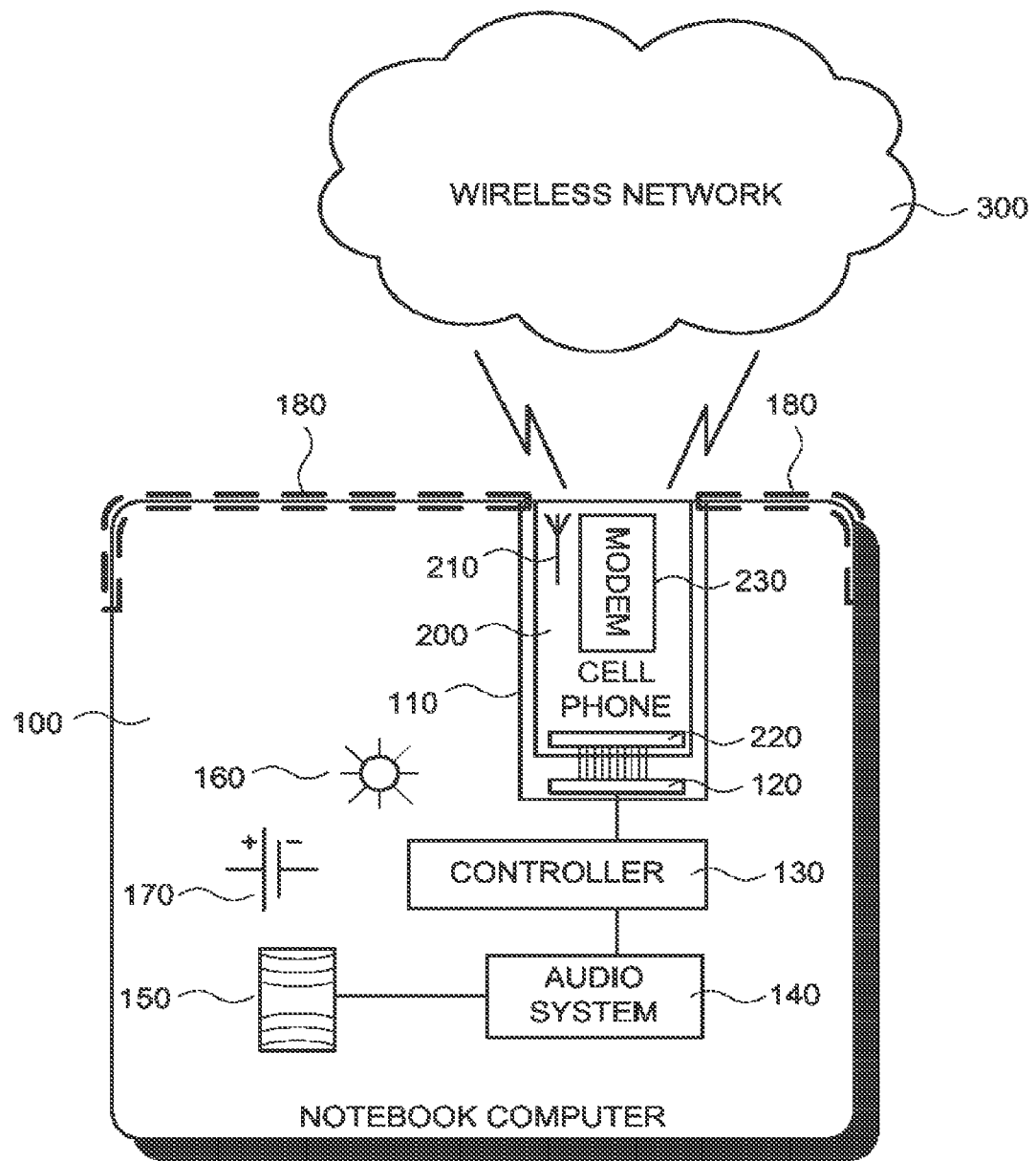
FIG. 1 is a simplified block diagram of a notebook computer and cell phone assembly, in accordance with an embodiment of the present invention.

Reference is made to FIG. 1, which is a simplified block diagram of a notebook computer and cell phone assembly, in accordance with an embodiment of the present invention. Shown in FIG. 1 is a notebook computer 100 with a pouch 110 for inserting a cellular communicator 200, a connector 120 for connecting to a corresponding communicator connector 220, a controller 130, an amplifier 140 with a speaker 150 for an audio system of the computer, a visual indicator 160 such as an LED indicator, and a battery 170. Communicator 200 includes an antenna 210 for signal reception and transmission, and a modem 230 for communicating over a wireless network 300. Modem 230 is generally both a modem and a controller for communicator 200.

Notebook computer 100 includes conventional memory units for storing programs and data, input devices including inter alia a mouse and keyboard, and an output display device (not shown). The memory units and the device drivers for the mouse, keyboard and display are coupled communicatively with controller 130 using a conventional data bus. It will be appreciated, however, from the description hereinbelow, that the present invention may also be implemented with computing devices other than notebook computers, provided that such devices include processing means, program and data storage means, and input and display means that inter-communicate. The present invention may be implemented within a standalone computer or within one or more networked computers.

In an embodiment of the present invention, pouch 110 is sufficiently deep so that communicator 200 is encased within notebook computer 100 when fully inserted in pouch 110. Pouch 110 includes a push-pop mechanism to eject communicator 200 for detachment from notebook computer 100. In order not to interfere with signal reception of communicator 200, the housing of notebook computer 100 is manufactured using non-intrusive material that does not interfere with reception, at least for portions of the housing surrounding antenna 210, such as the portions designated as 180 in FIG. 1.

In accordance with an embodiment of the present invention, notebook computer 100 is operative to detect an incoming call for communicator 200, and to activate an indicator, such as blinking of visual indicator 160, to notify a user of the incoming call. Alternatively or additionally, the indicator may be ringing of speaker 150. Communicator 200 is able to receive the incoming call whether it is attached to or detached from notebook computer 100.

A feature of this embodiment of the present invention is the capability of activating the indicator, regardless of whether notebook computer 100 is in normal power mode, standby mode, hibernate mode, sleep mode, or turned off. As such, communicator 200 is operative to receive incoming calls and to notify the user of the calls, regardless of the power saving mode of notebook computer 100. According to one embodiment of the present invention, such operation is accomplished by using battery 170 as a power source, when communicator 200 is attached to notebook computer 100, regardless of the power mode of notebook computer 100.

Generally today, notebook computers, including those that run Windows XP and Vista, have power saving modes, such as "standby mode", "hibernate mode" and "sleep mode". Standby mode shuts down all but the essential components of notebook computer 100. When in standby mode, the monitor of notebook computer 100 is blank and notebook computer 100 is unusable.

However, notebook computer 100 quickly comes out of standby mode, in a matter of a few seconds, when a button is pressed. For some computers, any button on the keyboard may be pressed to bring the computer back from standby mode to normal operation. For other computers, the power button must be pressed to bring the computer back to normal operation. When notebook computer 100 transitions from standby mode to normal operation, notebook computer 100 is in the same condition that it was prior to entering standby mode.

While in standby mode, notebook computer 100 consumes a small amount of power. If battery 170 were to fail while notebook computer 100 is in standby mode, all unsaved data is lost.

Hibernate mode saves a snapshot of the state of notebook computer 100, and then shuts the computer completely off. Currently unsaved data is saved, as during a normal shut down. When notebook computer 100 is turned back on, it appears the same as it did before entering hibernate mode.

Notebook computer 100 comes slowly out of hibernate mode, often lasting several minutes, since it was completely shut down. While in hibernate mode, notebook computer 100 consumes no power.

Sleep mode puts notebook computer 100 into standby mode, and subsequently into hibernate mode if one or both of the following events occur:

i. battery 170 becomes critically low;
ii. a pre-specified user configurable time delay is reached.

In accordance with one embodiment of the present invention, irrespective of its power mode, notebook computer 100 is powered by battery 170 when communicator 200 is attached to notebook computer 100. Optionally, visual indicator 160 and amplifier 140 are also powered when communicator 200 is attached to notebook computer 100, irrespective of the power mode of notebook computer 100.

Figure 2:
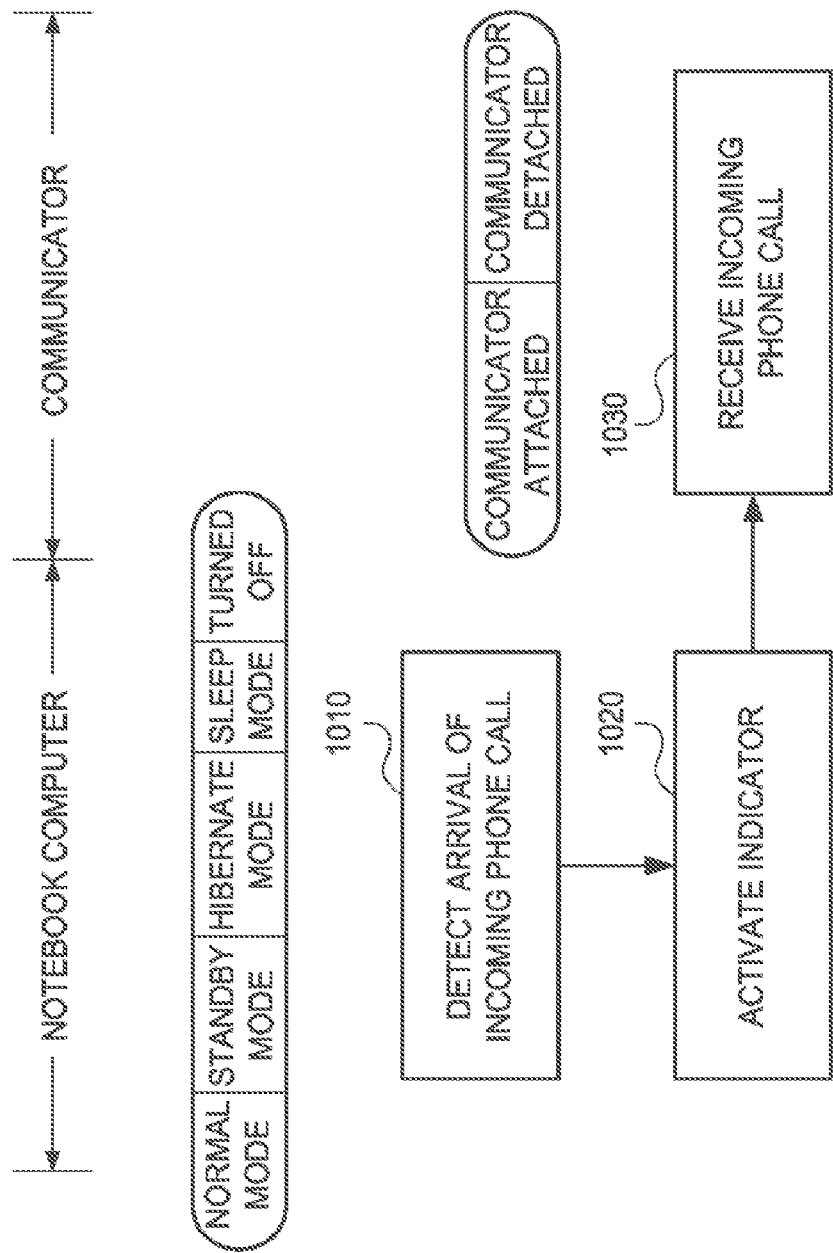
FIG. 2 is a simplified flowchart of a method for operation of a notebook computer and cell phone assembly, in accordance with an embodiment of the present invention.

Reference is made to FIG. 2, which is a simplified flowchart of a method for operation of a notebook computer and cell phone assembly, in accordance with an embodiment of the present invention. The flowchart of FIG. 2 is divided into two columns, the left column indicating steps performed by a notebook computer and the right column indicating steps performed by a cellular communicator that attaches to and detaches from the notebook computer.

At step 1010, while the communicator is attached to the notebook computer, the notebook computer detects an incoming call intended for the cell phone. Step 1010 is performed when the notebook computer is in normal power mode or power saving mode. At step 1020 the notebook computer activates an indicator, such as a blinking LED or a ringing speaker, notifying the user of the incoming call. At step 1030, the communicator receives the incoming call, whether the communicator is attached to the notebook computer or detached from the notebook computer.

Figure 3:
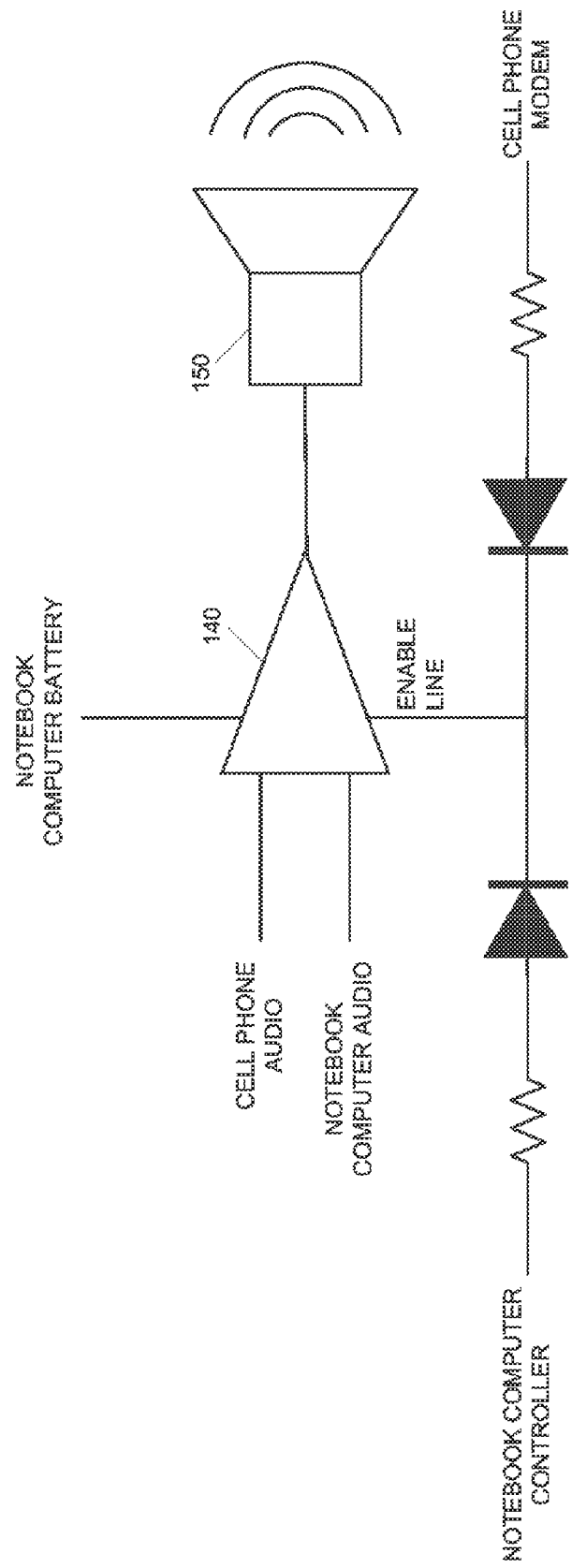
FIG. 3 is a simplified diagram of a circuit for activating a speaker of a notebook computer regardless of the power mode of the computer, in accordance with an embodiment of the present invention.

Reference is made to FIG. 3, which is a simplified diagram of a circuit for activating speaker 150 of notebook computer 100 regardless of the power mode of computer 100, in accordance with an embodiment of the present invention. The circuit shown in FIG. 3 enables speaker 150 to operate in conjunction with communicator 200 when computer 100 is in normal power mode, or in a power saving mode such as standby mode, hibernate mode, sleep mode, or turned off.

Shown in FIG. 3 is amplifier 140 and speaker 150 of notebook computer 100. Computer 100 and communicator 200 are each able to transmit input to amplifier 140. Also shown in FIG. 3 is an enable line, via which computer 100 and communicator 200 can each enable or disable amplifier 140. In accordance with an embodiment of the present invention, when communicator 200 is attached to computer 100, amplifier 140 is automatically enabled.

When communicator 200 is detached from computer 100, then amplifier 140 is powered by battery 170 whenever computer 100 enables amplifier 140. Typically, computer 100 enables amplifier 140 when operating in normal power mode, and computer 100 disables amplifier 140 when operating in power saving mode.

Regarding the source of the power supplied to amplifier 140 when communicator 200 is attached to computer 100, one of three alternative embodiments may be used in accordance with the present invention. In the first embodiment, amplifier 140 is powered from battery 170 whenever amplifier 140 is enabled.

In the second embodiment, amplifier 140, when enabled, is powered from battery 170 when computer 100 is operating in normal power mode, and is powered from a power supply of communicator 200 when computer 100 is operating in standby mode, in hibernate mode, in sleep mode, turned off or in such other power saving mode.

In the third embodiment, amplifier 140 is powered from the power supply of communicator 200 whenever amplifier 140 is enabled.

Figure 4:
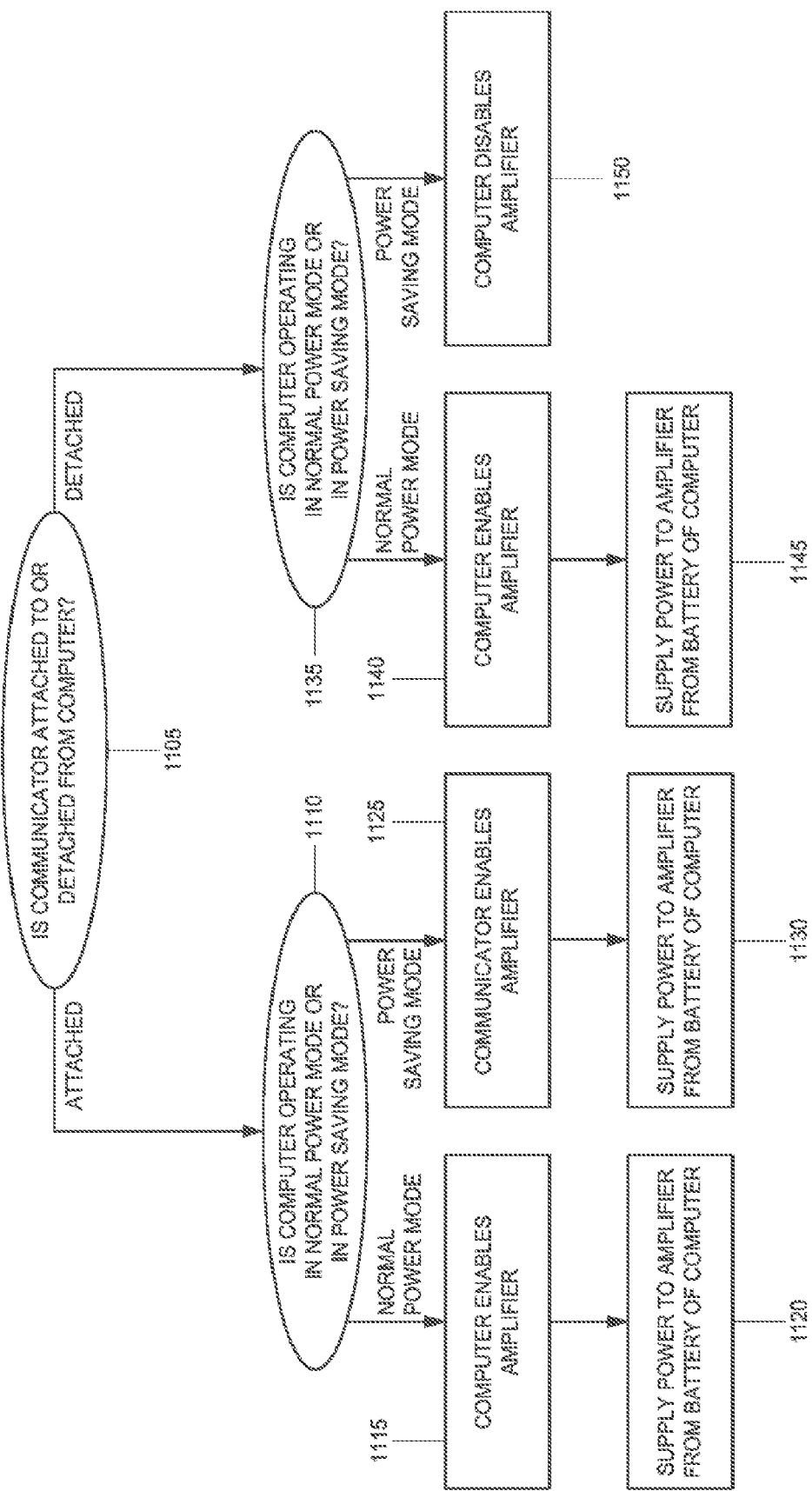
FIG. 4 is a simplified flowchart of the logic of the circuit of FIG. 3 for enabling and powering a speaker amplifier, in accordance with a first embodiment of the present invention.

Reference is made to FIG. 4, which is a simplified flowchart of the logic of the circuit of FIG. 3 for enabling and powering amplifier 140, in accordance with the first embodiment of the present invention. As shown in FIG. 4, at step 1105 a determination is made as to whether or not communicator 200 is attached to or detached from computer 100. If communicator is attached to computer 100, then at step 1110 a further determination is made as to whether computer 100 is operating in a normal power mode, or in a power saving mode. If computer 100 is operating in a normal power mode, then at step 1115 amplifier 140 is enabled by computer 100, and at step 1120 power is supplied to amplifier 140 from battery 170. Otherwise, if computer 100 is operating in a power saving mode, then at step 1125 amplifier 140 is enabled by communicator 200, and at step 1130 power is supplied to amplifier 140 from battery 170.

If communicator 200 is detached from computer 100, as determined at step 1105, then at step 1135 a further determination is made as to whether computer 100 is operating in a normal power mode, or in a power saving mode. If computer 100 is operating in a normal power mode then at step 1140 amplifier 140 is enabled by computer 100, and at step 1145 power is supplied to amplifier 140 from battery 170. Otherwise, if computer 100 is operating in a power saving mode, then at step 1170 amplifier 140 is disabled by computer 100.

Figure 5:
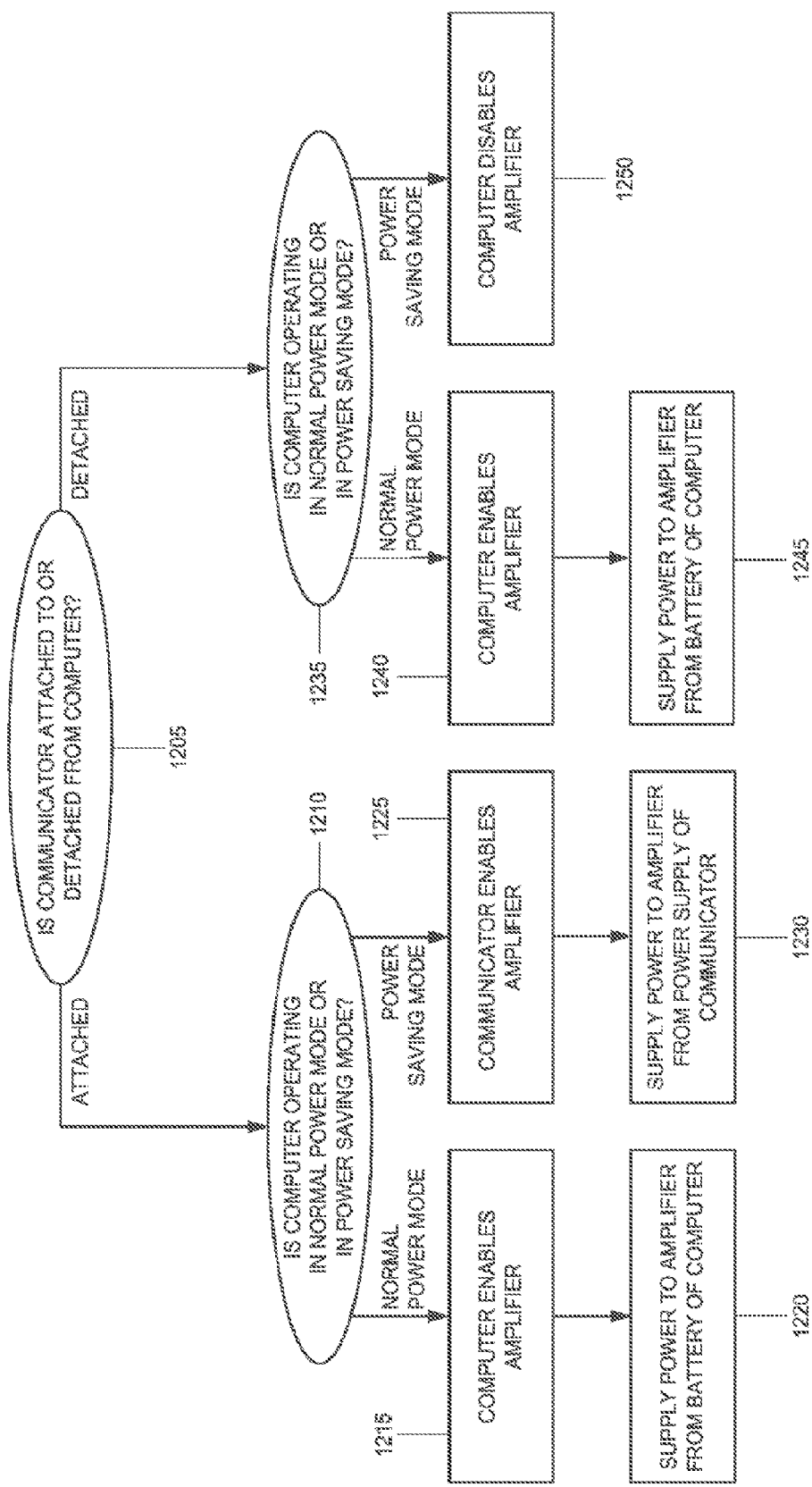
FIG. 5 is a simplified flowchart of the logic of the circuit of FIG. 3 for enabling and powering a speaker amplifier, in accordance with a second embodiment of the present invention.

Reference is made to FIG. 5, which is a simplified flowchart of the logic of the circuit of FIG. 3 for enabling and powering amplifier 140, in accordance with a second embodiment of the present invention. The steps of FIG. 5 are similar to the corresponding steps in FIG. 4, except for step 1230. In the case where communicator 200 is attached to computer 100 and computer 100 is operating in a power saving mode, then a power supply of communicator 200 supplies power to amplifier 140.

Figure 6:
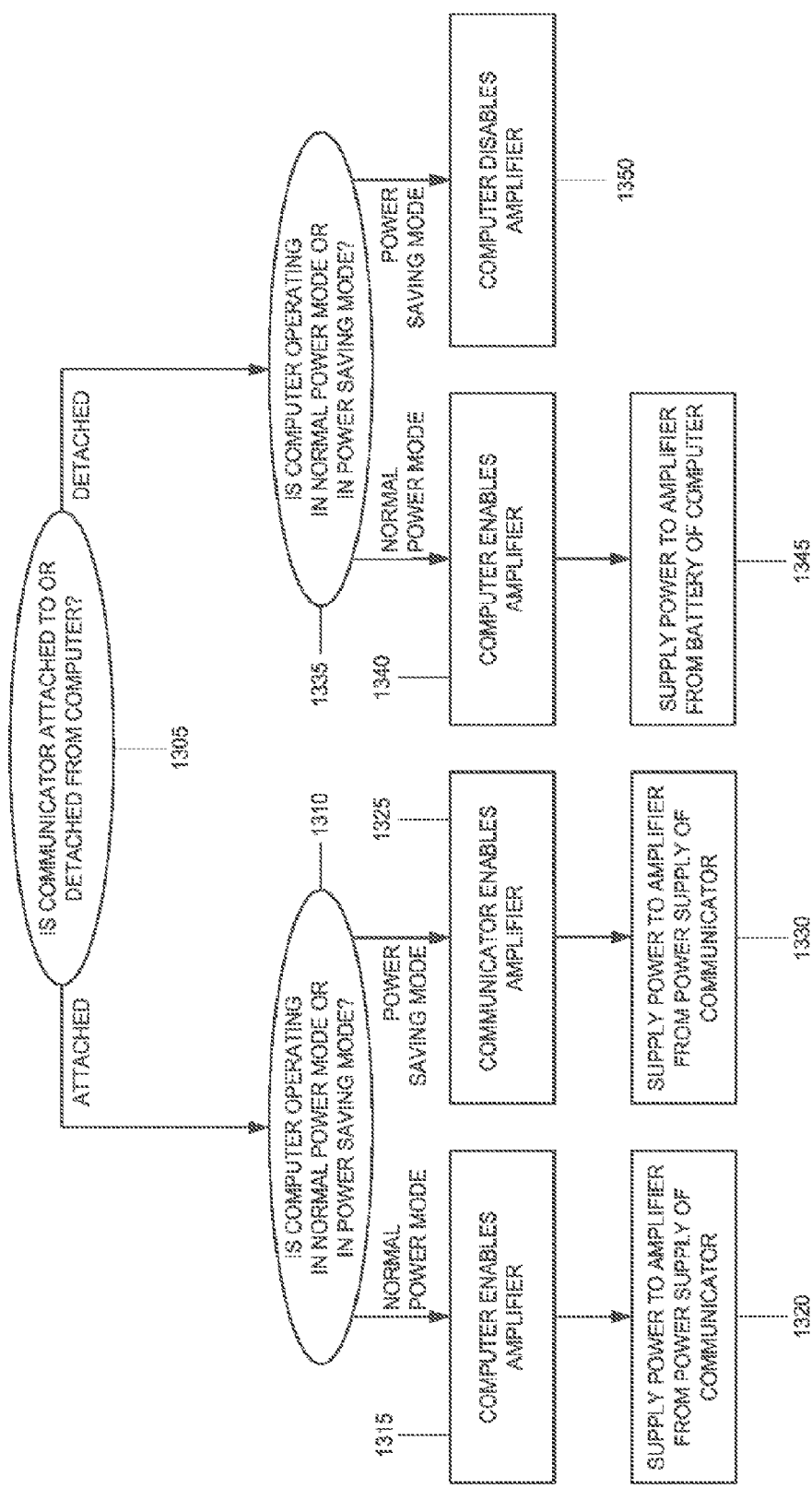
FIG. 6 is a simplified flowchart of the logic of the circuit of FIG. 3 for enabling and powering a speaker amplifier, in accordance with a third embodiment of the present invention.

Reference is made to FIG. 6, which is a simplified flowchart of the logic of the circuit of FIG. 3 for enabling and powering amplifier 140, in accordance with a third embodiment of the present invention. The steps of FIG. 6 are similar to the corresponding steps in FIG. 5, except for step 1320. In the case where communicator 200 is attached to computer 100, amplifier 140 is always powered by the power supply of communicator 200, regardless of whether computer 100 is operating in normal or power saving mode.

Figure 7:
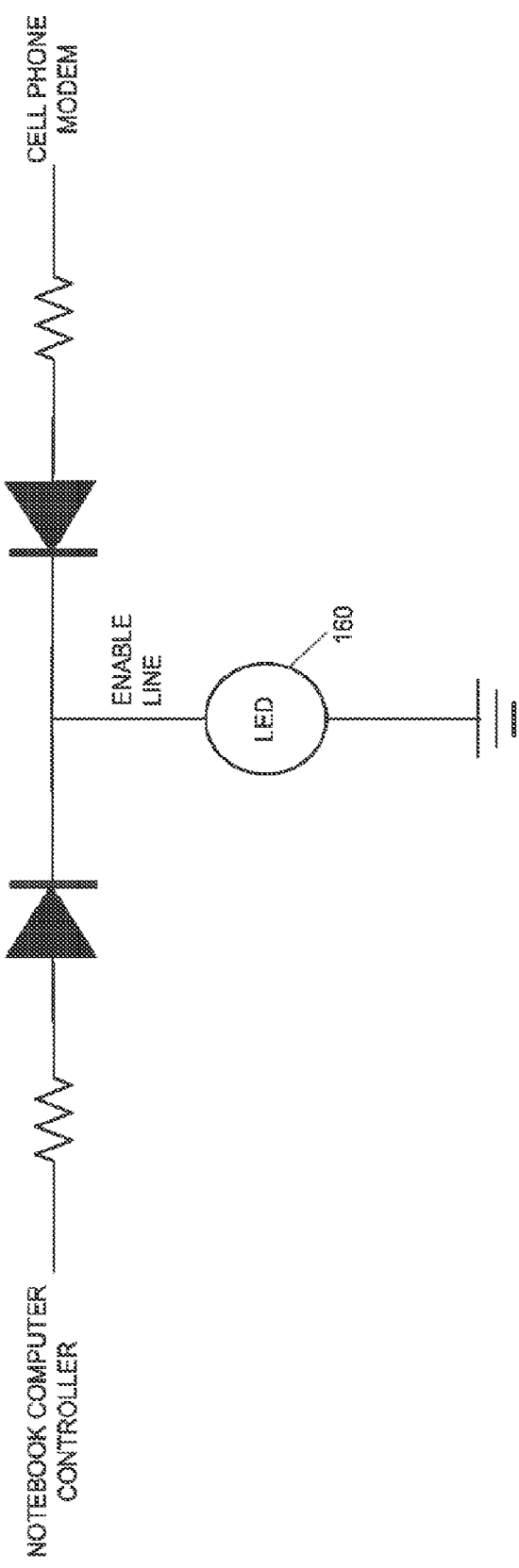
FIG. 7 is a simplified diagram of a circuit for activating an LED of a notebook regardless of the power mode of the computer, in accordance with an embodiment of the present invention.

Reference is made to FIG. 7, which is a simplified diagram of a circuit for activating an LED of a notebook regardless of the power mode of the computer, in accordance with an embodiment of the present invention. The circuit shown in FIG. 7 enables LED 160 to operate in conjunction with communicator 200 when computer 100 is in a normal power mode, or in a power saving mode such as standby mode, hibernate mode sleep mode, or turned off.

Shown in FIG. 7 is indicator 160 of computer 100. Computer 100 and communicator 200 are each able to light indicator 160. Also shown in FIG. 7 is an enable line, via which computer 100 and communicator 200 can each enable or disable indicator 160. When communicator 200 is attached to computer 100, indicator 160 is automatically enabled.

When communicator 200 is detached from computer 100, then indicator 160 is powered by battery 170 whenever computer 100 enables indicator 160. Typically, computer 100 enables indicator 160 when operating in normal power mode, and computer 100 disables indicator 160 when operating in power saving mode.

Regarding the source of the power supplied to indicator 160 when communicator 200 is attached to computer 100, the same three alternative embodiments described hereinabove with reference to the system of FIG. 3 for enabling and powering amplifier 140, may be used with the system of FIG. 7 for enabling and powering indicator 160. These embodiments correspond to the flowcharts of FIGS. 4-6.

Since indicator 160 generally requires only a small amount of power for its operation, the embodiment of FIG. 6 may be more practical for powering indicator 160 when communicator 200 is attached to computer 100.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A communication system comprising,
   a computer comprising:
      a controller operable to transition between a plurality of power modes, including a normal power mode and at least one power saving mode;
      an internal amplifier that is enabled or disabled by said controller and that is enabled by a modem of a cellular communicator that is attached to the computer, to receive audio data from said controller when said controller is the normal power mode, and to receive audio data from the modem of the cellular communicator when said controller is in a power saving mode; and
      a battery to supply power to said amplifier and to said controller when it is in normal power mode; and
   a cellular communicator attached to said computer, comprising:
      a modem to communicate over a wireless network, to enable said amplifier when said controller is in a power saving mode, and to transmit audio data to said amplifier; and
      a power supply of the cellular communicator to supply power to said amplifier.

2. The communication system of claim 1 wherein said computer battery supplies power to said amplifier whenever said amplifier is enabled.

3. The communication system of claim 1 wherein said cellular communicator is attachable to and detachable from said computer, and wherein said modem automatically enables said amplifier when said cellular communicator is attached to said computer.

4. The communication system of claim 3 wherein said cellular communicator power supply supplies power to said amplifier when said cellular communicator is attached to said computer and said controller is in a power saving mode.

5. The communication system of claim 3 wherein said communicator power supply supplies power to said amplifier whenever said cellular communicator is attached to said computer.

6. The communication system of claim 1 wherein said computer further comprises a light emitting diode (LED) indicator, wherein said controller enables and disables said LED indicator, wherein said computer battery supplies power to said LED indicator, and wherein said modem enables said LED indicator.

7. The communication system of claim 6 wherein said computer battery supplies power to said LED indicator whenever said LED indicator is enabled.

8. The communication system of claim 6 wherein said cellular communicator is attachable to and detachable from said computer, and wherein said modem automatically enables said LED indicator when said cellular communicator is attached to said computer.

9. The communication system of claim 8 wherein said cellular communicator power supply supplies power to said LED indicator when said cellular communicator is attached to said computer and said controller is in a power saving mode.

10. The communication system of claim 8 wherein said communicator power supply supplies power to said LED indicator whenever said cellular communicator is attached to said computer.

11. A method comprising:
   enabling and powering an internal amplifier of a computer when a cellular communicator is attached to the computer, comprising:
   supplying power from a battery of the computer to the amplifier;
   when the computer is operating in a normal power mode, then;
      enabling, by the computer, the amplifier; and
      transmitting, by the computer, audio data to the amplifier;
   when the computer is operating in a power saving mode, then:
      enabling, by the cellular communicator that is attached to the computer, the amplifier; and
      transmitting, by the communicator, audio data to the amplifier.

12. A method comprising:
   enabling and powering an internal amplifier of a computer when a cellular communicator is attached to the computer, comprising:
   when the computer is operating in a normal power mode, then:
      enabling, by the computer, the amplifier; transmitting, by the computer, audio data to the amplifier; and
      supplying power from a battery of the computer to the amplifier; and
   when the computer is operating in a power saving mode, then:
      enabling, by the cellular communicator that is attached to the computer, the amplifier;

transmitting, by the cellular communicator, audio data to the amplifier; and supplying power from a power supply of the cellular communicator to the amplifier.

13. A method comprising:

enabling and powering an internal amplifier of a computer when a cellular communicator is attached to the computer, comprising:

supplying power from a power supply of the cellular communicator to the amplifier;

when the computer is operating in a normal power mode, then:
- enabling, by the computer, the amplifier; and
- transmitting, by the computer, audio data to the amplifier;

when the computer is operating in a power saving mode, then:
- enabling, by the cellular communicator that is attached to the computer, the amplifier; and
- transmitting, by the cellular communicator, audio data to the amplifier.

* * * * *